JOSEPH C. TILTON.

Improvement in Preserving Sweet Potatoes.

No. 124,987. Patented March 26, 1872.

123,987

UNITED STATES PATENT OFFICE.

JOSEPH C. TILTON, OF PITTSBURG, PENNSYLVANIA.

IMPROVEMENT IN PRESERVING SWEET POTATOES.

Specification forming part of Letters Patent No. 124,987, dated March 26, 1872.

Specification describing an Improved Mode of Preserving Sweet Potatoes from rotting or shrinking, and the house and apparatus used for that purpose, invented by JOSEPH C. TILTON, of the city of Pittsburg, in the county of Allegheny and State of Pennsylvania.

The first part of my invention consists in preserving a nearly uniform temperature of from 40° to 60°, having a mean of 50°, in the house or building in which the sweet potatoes are stored; the object of this being to prevent the potatoes from freezing by the store-room getting too cold, or of sweating and heating by the room being too hot, either of which will rot the potatoes. The second part of my invention relates to the construction of the building in which the sweet potatoes are stored, and to the heating apparatus, and its combination with the building for the purpose described; the object of this part of my invention being to obtain the best and most convenient arrangement for applying my mode of preserving sweet potatoes.

Figure 1:
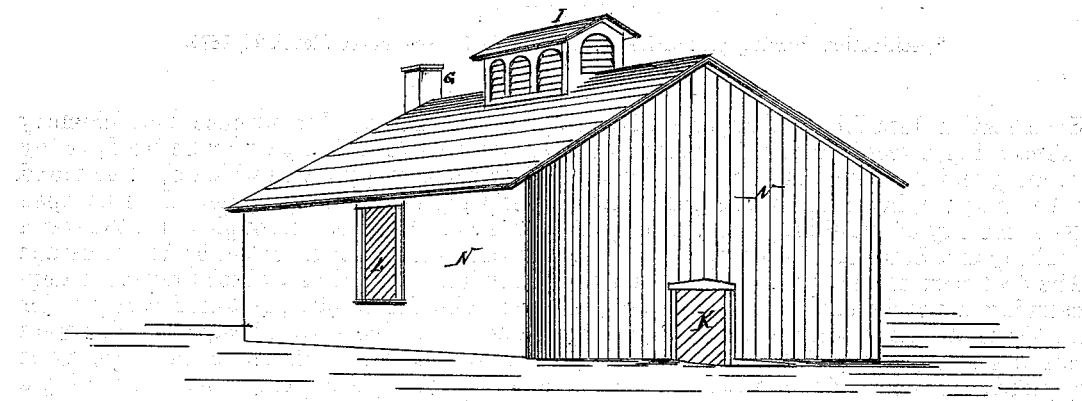
Figure 3:
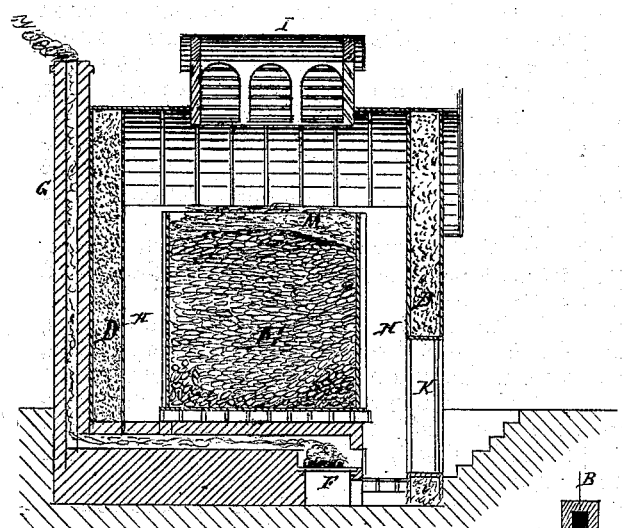
Figure 2:
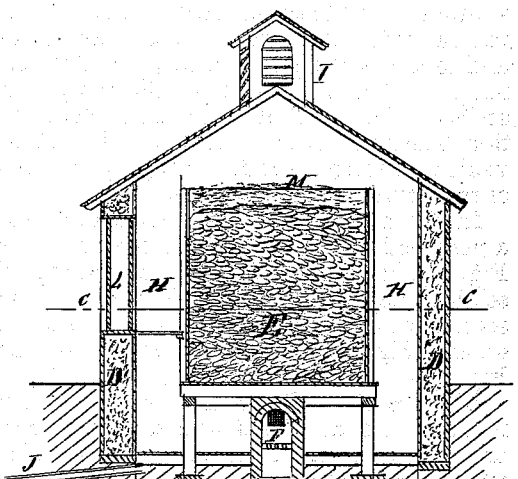
Figure 4:
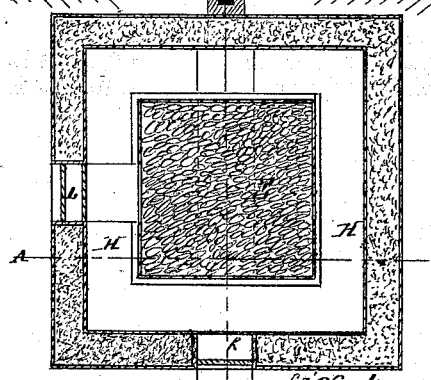

In the accompanying drawing, Figure 1 is a perspective view of my sweet-potato house; Fig. 2, a cross-section of the same through the section-line A A of Fig. 4; Fig. 3, a vertical section through the section-line B B of Fig. 4; and Fig. 4, a plan taken at the line C C, Fig. 2.

D D are the walls of the house, which are made double, and filled with saw-dust or other non-conducting material. E is the bin in which the potatoes are placed; this bin is elevated above the floor, and under it the furnace for heating the building is placed. F is the furnace, the flue of which passes under the floor of the bin E into the chimney G; or in place of the regular furnace and chimney shown a stove and pipe may be used, or any other heating apparatus which shall be found best adapted to the purpose. H is an open space around the bin, through which the warm air circulates. I is a ventilator for the escape of foul air. J is a drain, which prevents dampness when the building is placed partly under ground; K, door-way through which access is gained to the furnace. This door-way is closed by two doors, the inner one having a sash filled with glass, forming its upper part to admit the light when the outer door is open. L, door-way having double doors, the inner one sash. Through this door access is gained to the upper part of the bin, and the potatoes received and delivered. M, chaff, cut-straw, or dry hay, which is laid over the potatoes to absorb the dampness.

I do not confine myself to the exact construction described, but merely give it as one of the best; nor do I claim as novel the double walls.

What I do claim as my invention, and desire to secure by Letters Patent of the United States, is—

1. The combination of a heating apparatus, for the preservation of a uniform temperature, with a building for storing sweet potatoes.

2. The house N and furnace F or its equivalent, in combination with the bin E, when arranged substantially as and for the purpose described.

JOSEPH C. TILTON.

Witnesses:
 FRANCIS L. CLARK,
 ANDREW HUMBERT.